United States Patent [19]
Klass et al.

[11] 3,854,894
[45] Dec. 17, 1974

[54] PERMEANT GAS METHOD AND APPARATUS
[76] Inventors: Donald L. Klass, 732 Summit, Chicago, Ill. 60010; Carl D. Landahl, 2256 W. 112th St., Chicago, Ill. 60643
[22] Filed: Jan. 10, 1972
[21] Appl. No.: 216,719

Related U.S. Application Data
[63] Continuation-in-part of Ser. No. 25,850, Apr. 6, 1970, Pat. No. 3,634,053

[52] U.S. Cl. ............................ 48/195, 137/3, 137/7, 137/88, 137/604, 261/27, 261/104
[51] Int. Cl. .............................................. C10j 1/28
[58] Field of Search ............ 55/16, 158; 261/17, 27, 261/104, DIG. 17; 48/195, 196 FM; 239/49, 50; 137/3, 7, 80, 93, 604

[56] References Cited
UNITED STATES PATENTS
2,433,741  12/1947  Crawford .............................. 55/16
2,506,656   9/1950  Wallach et al. ....................... 55/16
3,699,032  10/1972  Rapp .................................. 55/16 X
3,634,053   1/1972  Klass et al. .......................... 48/195

Primary Examiner—Barry S. Richman

[57]                ABSTRACT

Permeant gas is metered into a flowing gas stream by sensing the rate of flow of the stream or the permeant gas concentration of the stream and reporting said rate or concentration as an output signal to an actuating means joined to a membrane assembly having a gas permeable membrane part immersed in the stream. Permeant gas within the assembly is permeated through the membrane, and into the stream in response to said output signal.

6 Claims, 5 Drawing Figures 3,854,894
FIG. 1
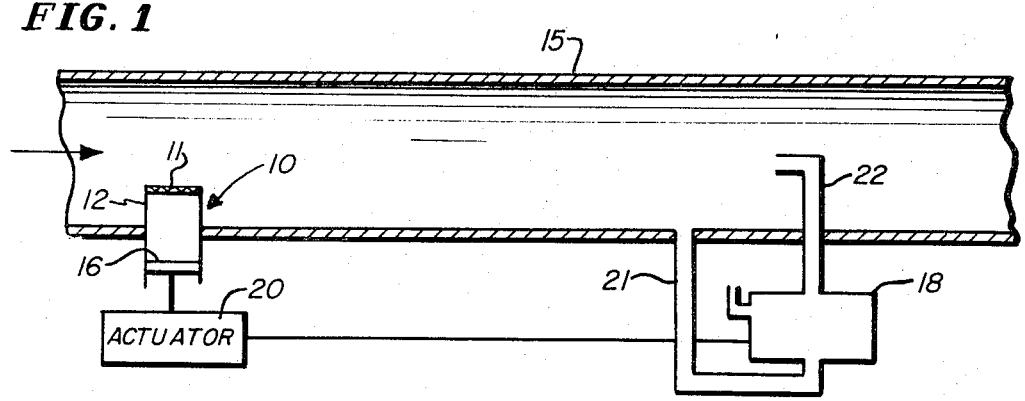
FIG. 2
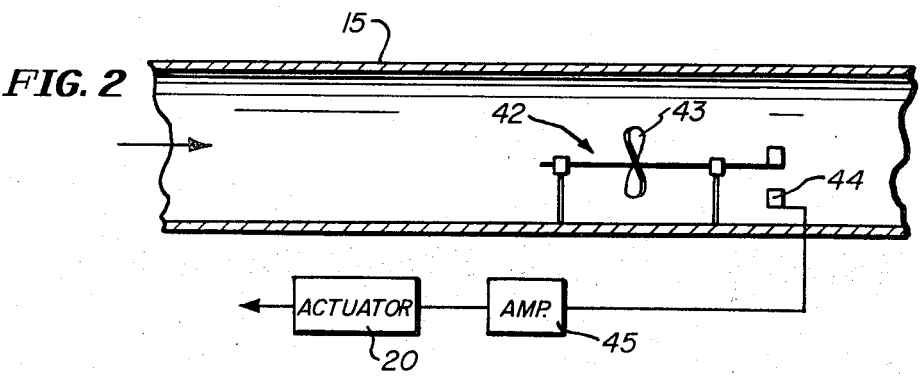
FIG. 3
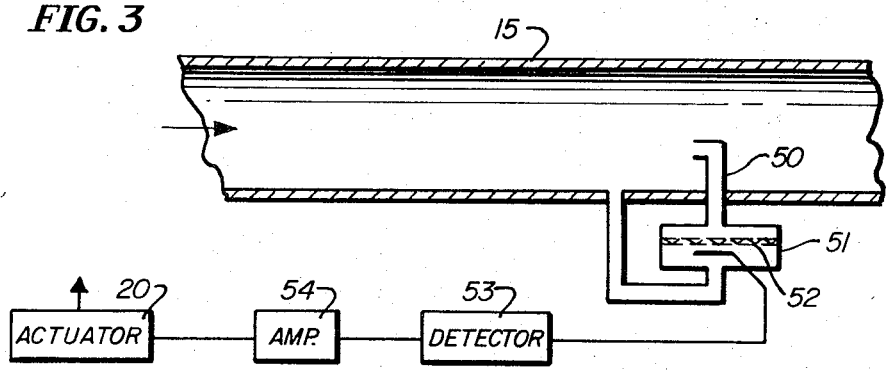
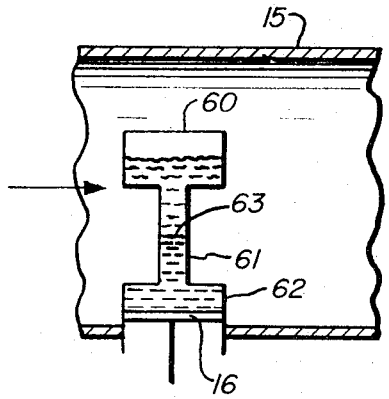
FIG. 5
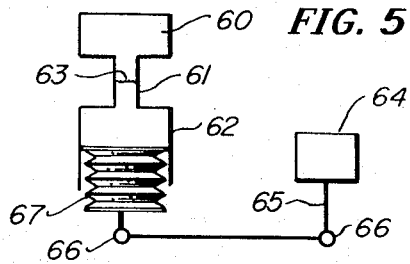
FIG. 4

PERMEANT GAS METHOD AND APPARATUS

This invention relates to improved methods and apparatus for delivering precise and controllable amounts of permeants to a gas stream, such as a natural gas stream. This application is a continuation-in-part of Ser. No. 025,850 filed Apr. 6, 1970, now U.S. Pat. No. 3,634,053 by the same applicants.

Natural gas, distributed for fuel and industrial use, contains odorants comprised most commonly of low-molecular-weight organic sulfur compounds such as mercaptans and sulfides, for example, thiophane, dimethyl sulfide, isopropyl mercaptan n-propyl mercaptan, and others. Such odorants may be used alone or in various mixtures. References will be made herein to tert-butyl mercaptan (TBM), which is a compound now in common use as an odorant for natural gas. TBM is a volatile liquid at room temperature, but is used as an odorant gas in a flowing natural gas stream. These compounds are effective at very low concentrations, and warn of leaks or quipment failure. In the case of TBM, for example, the odorant concentration generally desired is approximately 3/4 lb/million CF.

Numerous different methods and apparatus presently are used to deliver odorants to a flowing natural gas stream, however, most if not all are objectionable, for one reason or another. Some are extremely complex and, for this reason, also costly and difficult to operate and maintain. Others are relatively simple, but they again are difficult to operate. The most critical objection to any of these prior systems is the inability to precisely and continuously meter a given amount of odorant to the natural gas stream. Industry therefore, has been seeking an improved method and apparatus for adding these odorants. Other permeant gases are desirably delivered in metered amounts through a membrane, for example, primary gas standards for trace gas analysis.

According to the present invention, precise metering of gaseous and liquid permeants into a flowing gas stream membrane, accomplished by permeation of the permeant through a permeable membrane. which is immersed in the gas stream. A sensing device is employed to detect changes in the desired levels of said permeant in the stream by sensing changes in the flow rate of the flowing gas, or concentration of permeant in the gas. Variable amount of permeant is then added, in response to changes, that is, the input of permeant into the stream is proportional to the flow rate or the permeant concentration. The amount of permeant delivered may, therefore, be increased, decreased, or stopped. The rate of permeation of the permeant is automatically adjusted in an appropriate manner to maintain the pre-established permeant level in accordance with changing levels of the permeant in the natural gas stream. Reference will be made now particularly to an odorant permeant in natural gas streams, but other permeant gases in other flowing gas streams may operate in like manner.

The odorant system, fully described blow, offers numerous advantages not available with present systems including, for example, low cost, simplicity of operation, little or no maintenance, and the elimination of most, if not all, moving mechanical parts. In addition, the odorant system is capable of operation over a broad temperature range of −50° to 200°F., however, the preferred operating range is within a temperature range of 30° to 70°F., which corresponds to the temperatures generally encountered in dealing with natural gas pipelines. The odorant system also is readily adaptable to commonly employed types of natural gas pipeline systems, and local distribution systems. The operating ranges of the pressure, flow rate and pipe diameters are, respectively, on the order of 0.3-1,000 Psig; 200-50,000 CF/hr; and 2-24 inches. While particular reference is made herein to a natural gas stream the principles of the invention are understandably applicable to introducing odorant into other confined gas streams. These may include liquefied natural gas (LNG) or liquefied propane gas (LPG) or still other liquefied or room temperature liquid hydrocarbons.

Accordingly, it is an object of the present invention to provide improved methods and apparatus for delivering precise and controllable amounts of odorants to a flowing gas stream, as required for predetermined detection levels.

Another object is to provide improved methods and apparatus of the above type wherein metering of the odorants is accomplished by permeating the odorant through a membrane interface, disposed in the natural gas stream, in response to changes in desired or predetermined odorant levels in the gas stream.

Still another object is to provide improved methods and apparatus of the above type including means for automatically adjusting the rate of permeation of the odorant, in accordance with changes in the flow rate of natural gas, or the concentration of odorant, to maintain a pre-established odorant level in the flowing natural gas stream.

A still further object is to provide an improved apparatus which is of low cost, simple in operation, requires little or no maintenance, and contains few, if any, moving mechanical parts, which apparatus delivers metered amounts of odorant to a natural gas stream.

Still another object is to provide improved methods and apparatus which are operable over a wide range of pressure, gas flow rates and pipe diameters.

For a fuller understanding of the nature and objects of the invention, reference should be had to the following detailed description taken in connection with the accompanying drawings in which:

FIG. 1 is a block diagram type illustration of an odorizing apparatus exemplary of the invention;

FIG. 2 is a similar illustration of an odorizing apparatus exemplary of a second embodiment of the invention;

FIG. 3 is another similar illustration of still another type of odorizing apparatus;

FIG. 4 is an illustration of a membrane assembly which can be substituted for the membrane assembly of FIGS. 1-3; and FIG. 5 is a highly diagrammatic representation of a temperature correction device useful with odorizing apparatus.

Similar reference characters refer to similar parts throughout the several views of the drawings.

As indicated above, the precise metering of gaseous and liquid odorants into a flowing natural gas stream pipeline is accomplished by permeating an odorant through a membrane which is immersed in the natural gas stream. Numerous different membrane types and configurations may be used such as coils, tubes, sheets, cones, spheres, and the like. Different odorants can be employed, and odorizing apparatus can be of numerous different constructions, as explained more fully below.

A particular odorant and membrane combination is selected by considering the permeation rate of that odorant through the membrane. The permeation process is believed to include features of diffusion and solubility of the odorant in the membrane. See, for example, Li, N. N. and Long, R. B., *AICHE Journal* 15, No. 1, 73-80; Sheehan, C. J. and Bisio, A. L., *Rubber Chemistry and Technology* 39, No. 1, 149-192.

The rate of permeation through a membrane may be represented by Fick's Law:

$$q = KA(\Delta P)/\delta$$

where:
$q$ = flow rate of odorant through the membrane, cm³ (STP)/sec.
$K$ = permeability constant, cm³ (STP) cm/cm² sec cm Hg
$A$ = membrane area, cm²
$\Delta P$ = pressure of differential of odorant across the membrane, cm Hg
$\delta$ = thickness of membrane, cm The permeability constant K is a specific quantity for a given odorant and membrane, and can be determined by monitoring the odorant permeation through a membrane, using a known variable volume-constant pressure method, to which further reference will be made hereinafter.

It can be seen that the flow rate of odorant, or rate of permeation, of an odorant through a membrane is directly proportional to the membrane area and the pressure differential of odorant across the membrane, and is inversely proportional to the thickness of the membrane. Accordingly, the odorizing apparatus can be constructed such that the permeation rate of odorant is a function of the amount of natural gas flowing in the pipeline. Odorizing apparatus of this type can include a sensing device which detects changes in the natural gas flow rate and which, upon detecting an increase or decrease in the flow rate, provides a corresponding output signal. As one example of such sensor a "hot wire" may be placed in the gas stream. The temperature of the wire and its resistance, will change as the flow rate increases. This change in resistance may be picked up by a bridge and the amplified current may be used for drive means, such as a solenoid piston or the like, to cause the odorant to permeate the membrane. This output signal can be coupled to a membrane assembly including means responsive to these output signals to change the pressure applied to the odorant in the membrane assembly. This change in pressure, in turn, results in an increase or decrease in the permeation rate of odorant into the natural gas stream.

Changes in the desired or predetermined levels of odorant may also be sensed by detecting changes in odorant concentration in a sample of the gas stream. Various known sensing techniques to detect sulphur levels may be employed, which utilize apparatus such as an ITT Barton Model 286 Electrolytic for bromine electrochemical titration of total sulfur; various chromatographic apparatus employing argon or flame ionization detection, and apparatus in which sulfur is hydrogenated, and then the reduced sulfide is reacted with a reagent to form a methylene blue dye. The sulfur content is then determined by measuring the color development.

It will be understood that reference to "detecting changes in predetermined odorant levels" means determining change in flow rate of the stream or changes in the odorant concentration. The output signal may simply report a given change, or it may be a modulated output signal responsive to different changes. Both meanings are inteded by the term "output signal."

The odorizing apparatus can be of a construction such that the permeating rate of odorant is not dependent upon pressure changes in the membrane system, but is, instead, dependent upon the surface of the membrane exposed to the natural gas stream or, alternatively, the thickness of the membrane exposed to the natural gas stream. The odorizing apparatus also can employ two or more membranes, each of which is of a different permeability. These membranes are displaced so as to expose one or the other, or both, to the natural gas stream. The membrane also can be periodically inserted and removed from the natural gas stream, or the membrane can be in the form of a flexible container which is changed in size as the pressure within the pipeline changes, to thereby vary the permeation rate of odorant into the natural gas stream. The membrane may have the embodiment of a moving cone which exposes varying areas during movement to accordingly vary the odorant permeation into the stream. Still other embodiments will occur to practitioners.

The permeability constant K, as indicated above, can be determined by measuring the odorant permeated through the membrane. One measurement method is called the variable volume-constant pressure method. This method uses an elevated fixed pressure of the odorant on the input side of a diffusion cell in which a membrane is placed on a support, such as several layers of filter paper or a stainless steel mesh screen. The supported membrane is clamped between two halves of the cell, which provide a small space on each side of the membrane. Conduits communicate with each side, some with valves for gas pressure control. The odorant is delivered at elevated pressures on an input side, and it passed through the membrane to an output side maintained at a fixed pressure, generally atmospheric by way of a conduit vent. As the odorant permeates through the membrane, it acts upon a small slug of mercury in an open capillary tube attached to the output side and vented to the atmosphere. The displacement of the mercury slug with time is measured. The permeability, adjusted to STP, is computed directly from these measurements under steady-state conditions by:

$$K = xA_s \, \delta f/tA \, \Delta p$$

where:
$K$ = permeability, cm₃ (STP) cm/cm² sec cm Hg
$x$ = mercury slug displacement, cm
$A_s$ = mercury slug cross-sectional area, sq cm
$\delta$ = membrane thickness, cm
$f$ = correction factor to convert to STP 3.592 × output pressure (cm Hg) / output temp. (K°)
$t$ = time, seconds
$A$ = membrane area, sq cm
$\Delta p$ = input pressure less output pressure, cm Hg Various membranes may be employed such as polytetrafluroethylene, silicone rubber, polyvinylchloride, gelatin and the like. The permeability of the membranes may also be related to the solubility parameters of the odorant and the membrane as calculated by the method of Small, P. A., *J. Appl.* Chem. 3, 71-80 (1953). For example, the calculated solubility parameter of TBM is 7.61. The experimentally determined solubility parameter of silicone rubber is 7.3 and of polyvinylchloride is 9.6. In general, solubility parameters of membranes and odorants which are similar provide high permeation rate combinations. Thus, TBM should have a higher permeation rate in silicone rubber than in polyvinylchloride. Measurements show that the permeability factor of TBM in silicone rubber is about 15 times greater than in polyvinylchloride.

Several odorizing apparatus exemplary of the various different constructions which can be employed can now be described. The illustrated apparatus utilizes a silicone rubber membrane, 0.5 mil thick, and employs TBM as the odorant metered into the gas flow pipelines. The apparatus illustrated in FIG. 1 can be seen to include an enclosed membrane assembly 10 in the form of a cylinder 12 having a sheet-type, film membrane 11 affixed to its one end. The cylinder 12 is disposed within the pipeline 15, so that the membrane 11 is immersed in the natural gas stream flowing through the pipeline 15. The cylinder 12 functions as a reservoir for the odorant, and means (not shown) are provided for maintaining the supply of odorant within the reservoir. Pressure means 16, such as the piston illustrated, are disposed within the cylinder 12, and are operated to vary the pressure exerted on the odorant within the cylinder 12, to thereby change the rate of permeation of odorant into the natural gas stream in the pipeline 15. Alternatively, the pressure means can be, for example, a bellows which is increased or decreased in volume to vary the pressure exerted on the odorant within the cylinder 12.

The odorizing apparatus 12 also includes a fluidic amplifier 18 which is coupled to and functions to operate an actuator 20 associated with the cylinder or odorant reservoir 12 to, in turn, operate the pressure means 16. The fluidic amplifier has a static pressure tube 21 coupled to it which has its open end disposed within the pipeline 10 so as to be responsive to static pressures. This static pressure tube 21 in conjunction with the fluidic amplifier 18 establishes a static pressure within the system.

The fluidic amplifier 18 also has a pitot tube coupled to it which likewise has its end disposed within the pipeline 10 responsive to dynamic pressures. The flowing gas in the pipeline 10 exerts a dynamic pressure in the direction of flow, separate from its static pressure, which pressure is termed the pitot pressure and is proportional to the square of the flow rate of the natural gas. The pitot pressure operates the fluidic amplifier 18 to cause it to modulate its output signal so as to cause the actuator 20 to operate the pressure means 16 to increase or decrease the pressure exerted on the odorant in the reservoir, in accordance with the flow rate of the natural gas stream in the pipeline 10.

In constructing such a system or apparatus, the odorant to be used is established, and then the permeability constant K of the selected membrane is determined. Thereafter, surface area and thickness parameters of the membrane are established. Having established this, the output signal of the fluidic amplifier 18 is adjusted so that it operates the actuator 20 to, in turn, operate the pressure means 16 to exert the necessary pressure on the odorant reservoir 12, to establish the necessary rate of permeation of odorant into the natural gas stream. As the flow rate of natural gas is increased or decreased, the change will be detected by the fluidic amplifier to automatically compensate for change so that a precise metered amount of odorant always is permeated into the natural gas stream.

In FIG. 2, there is illustrated still another odorizing apparatus wherein the fluidic amplifier is replaced with a turbine blade assembly 42 which is fixedly installed within the pipeline. In this arrangement, the flow of natural gas in the pipeline causes the turbine blade 43 to rotate at a rate proportion to the gas flow rate. A speed pick-up assembly 44 is coupled to the turbine assembly 42, and senses the rate of rotation of the turbine blade 43. The output of the speed pick-up assembly 44 is coupled to and operates an amplifier 45 which, in turn, operates the actuator 20. The latter again functions to change the pressure applied to the odorant in the cylinder or odorant reservoir 12, to thereby increase or decrease the permeation rate of odorant into the natural gas stream, in accordance with the flow rate of the natural gas in the pipeline 10, in the manner described above.

In the foregoing embodiments, the sensing means is shown in the downstream location, and the membrane is immersed in the gas flow in the upstream location, but this relationship is not important when determining changes in the flow rate. When the sensing means is an odorant sensor, it is important that it be positioned downstream and the membrane be positioned upstream so that downstream detection will direct upstream correction of the odorant level.

In FIG. 3, there is illustrated still another odorizing apparatus employing a pitot pressure tube 50 and a transducer diaphragm 51. In this case, the pitot pressure tube 50 detects any changes in the flow rate of the natural gas stream in the pipeline, and exerts a corresponding force on the diaphragm 52 of the transducer 51. The displacement of the diaphragm 52 results in a variation in capacitance which is detected by a detector 53, amplified by an amplifier 54 which output is coupled to the actuator 20. The apparatus, again, is correspondingly calibrated or adjusted so that the actuator 20 operates the pressure on the odorant in the cylinder or odorant reservoir 12, to maintain the desired established rate of permeation of odorant into the natural gas stream.

In FIG. 4, there is illustrated a membrane assembly which can be substituted for and used in place of the membrane assembly described above, in any one of the three different odorizing apparatus. An odorant reservoir 60 is joined to a communicating, continuous membrane wall 61 and to another reservoir 62 which contains a non-permeable liquid. The odorant and liquid are immiscible so that their respective volumes are maintained separate. The communicating continuous membrane wall may be in the form of a coil. Pressure means, 10, illustrated as a piston 16, is disposed within the reservoir 62, and is operated by means of an actuator 20 such that a change of flow rate of the natural gas stream is sensed, in the manner described above, to operate the actuator 20 to exert a pressure on the non-permeating liquid in the reservoir 62. This pressure causes a change in the position of the interface 63 between the non-permeating liquid and the permeating odorant in the communicating membrane wall 61, to thereby vary the membrane surface area exposed to odorant. This variation, in turn, varies the rate of permeation of odorant into the natural gas stream.

Increases in temperature will, of course, tend to increase odorant permeation, and such effects may be counteracted by means such as those diagrammatically illustrated in FIG. 5, such means being disposed in a gas pipeline, or the like. No temperature correction device is indicated in association with a membrane assembly of the type shown in FIG. 4.

A temperature sensing material 64 may be in the form of a bimetallic which expands with temperature increase. The material 64 is joined by linkage 65 and pivots or fulcrums 66. The linkage and pivots are so interrelated that expansion of material 64 will cause piston bellow 67 to increase in volume to thereby operate to neutralize temperature effect. Decrease in temperature will cause the temperature sensing material 64 to contract and the bellow to decrease in volume to thereby expose additional amounts of odorant to the membrane. It will be appreciated that the piston bellows 67 will also be independently actuated in response to output signals corresponding to odorant concentration or flow rate, as previously described.

The foregoing specific descriptions relating to use of odorants in natural gas streams, and the like, may also be considered in association with other permeant gases and flowing gas streams. Permeant gases will permeate a membrane in a permeable membrane assembly which is positioned in a flowing gas stream. The permeant concentration will be sensed and reported in the form of an output signal to operate various actuating means, such as those previously disclosed herein. The rate of permeant gas passing from the enclosed membrane assembly will then be altered in accordance with the operation of said actuation means to meter controlled amounts through the membrane and into the flowing gas stream at a selected permeation rate.

The flowing gas stream may be a carrier gas such as helium, nitrogen or air which moves past a polymeric permeation tube containing the permeant gas in accordance with the known permeation tube technique used to obtain low level gas standards, as in trace gas analysis, see "Primary Standards for Trace Gas Analysis," O'Keefe and Ortman, Anal. Chem. 38, 760 (1966). A large number of known permeant gases may be used with permeable membrane tubing, such as Teflon. The permeant gases include carbon dioxide, sulfur dioxide, nitrogen dioxide, propane, butane, other hydrocarbons, halogenated hydrocarbons such as perfluorobenzene, and still other permeant gases. Liquefied gases are used to advantage.

Humidification is another example of a permeant gas passing through a semi-permeable membrane into a flowing gas stream, and then being sensed and reported to an actuating means. An aqueous medium in a membrane assembly may be heated to humidify air passing over the membrane assembly, the permeant aqueous vapor being sensed and reported to actuation means to control the temperature and metering. The permeant may also move, in an opposite manner, from the flowing stream to the membrane assembly. The aqueous medium may be cooled by actuation means to dehumidify air by sensing and reporting the aqueous vapor in the air. The aqueous vapor is then metered out of the flowing air stream in controlled amounts. Permeant gas operating in accordance with such features may be further understood by reference to U.S. Pat. No. 2,506,656.

Likewise, contaminants such as nitric oxide may be sensed in flowing exhaust streams and be metered through a semi-permeable membrane and into a membrane assembly following operation of the actuation means to obtain controlled amounts of said contaminant in the flowing exhaust stream. Other permeant gas and membrane assembly embodiments will occur to practitioners in use with a variety of gas streams.

The claims of the invention are now presented, and the terms in the language may be further understood by reference to the foregoing description and drawings.

What is claimed is:

1. A method for metering controlled amounts of a permeant gas through a membrane between a body of permeant liquid supply in a permeant reservoir in an enclosed membrane assembly and a flowing gas stream, at least a part of the assembly being a permeable membrane immersed in a flowing gas stream, said membrane having a selected permeation rate for the permeant gas, including the steps of sensing changes in permeant gas levels in the flowing gas stream from a pre-established level, reporting such changes in the form of an output signal to operate actuating means, such signal representing the difference between the pre-established level and the sensed permeant level, and moving the body of permeant liquid supply relative to said membrane to alter the rate of said permeant gas passing through said membrane in proportion to the sensed permeant level in the flowing stream and under operation of said actuating means to thereby meter a controlled amount of the permeant gas through the membrane and maintain the pre-established level of the permeant in the flowing gas stream.

2. A method which includes the steps of claim 1 above wherein the permeant gas moves from the enclosed membrane assembly to the flowing stream.

3. A method which includes the steps of claim 1 above wherein the permeant gas moves from the flowing stream into the membrane assembly.

4. A method which includes the steps of claim 1 above wherein the permeant liquid in the reservoir is liquefied gas.

5. A method which includes the steps of claim 1 above wherein said body of permeant liquid supply is moved by pressure means against the membrane to alter the rate of permeant passing through such membrane.

6. A method which includes the steps of claim 1 above wherein said body of permeant liquid supply is moved to displace a nonpermeable liquid out of contact with the membrane and thereby contact such membrane with the liquid permeant to alter the rate of permeant moving through said membrane.

* * * * *

UNITED STATES PATENT OFFICE
CERTIFICATE OF CORRECTION

Patent No. 3,854,894            Dated December 17, 1974

Inventor(s) Donald L. Klass et al.

It is certified that error appears in the above-identified patent and that said Letters Patent are hereby corrected as shown below:

On the Title Page, the following should be added:

-- [73] Assignee: Institute of Gas Technology,
Cook County, Ill., a corp. of Illinois -- .

Signed and Sealed this ninth Day of March 1976

[SEAL]

Attest:

RUTH C. MASON
*Attesting Officer*

C. MARSHALL DANN
*Commissioner of Patents and Trademarks*